United States Patent [19]

Carothers

[11] Patent Number: 5,026,233

[45] Date of Patent: Jun. 25, 1991

[54] LOCKING NUT INSERT IN A SCREW-NUT ARRANGEMENT

[75] Inventor: Arthur D. Carothers, Beaver Falls, Pa.

[73] Assignee: Westinghouse Electric Corp., Pittsburgh, Pa.

[21] Appl. No.: 508,456

[22] Filed: Apr. 13, 1990

[51] Int. Cl.⁵ .............................................. F16B 13/06
[52] U.S. Cl. ..................................... 411/177; 200/303; 411/179; 411/353
[58] Field of Search ............... 411/177, 179, 180, 327, 411/352, 353, 427, 517, 970, 182; 200/303, 293, 400, 401

[56] References Cited

U.S. PATENT DOCUMENTS

| | | | |
|---|---|---|---|
| 2,102,558 | 12/1937 | Johnson | 411/177 |
| 2,283,123 | 5/1942 | Osborne | 411/913 X |
| 2,658,248 | 11/1953 | Kost | 411/182 |
| 2,744,769 | 5/1956 | Roeder et al. | 411/517 X |
| 3,027,670 | 4/1962 | Kramer et al. | 411/352 X |
| 3,358,728 | 12/1967 | Hughes | 411/180 |
| 3,430,014 | 2/1969 | Walters et al. | 200/303 X |
| 4,206,335 | 1/1980 | Kummerow et al. | 200/303 |
| 4,430,033 | 2/1984 | McKewan | 411/177 X |
| 4,610,589 | 9/1986 | Bredal | 411/180 |
| 4,801,230 | 1/1989 | Wilburn | 411/177 X |
| 4,842,462 | 6/1989 | Tiwesley | 411/180 |

FOREIGN PATENT DOCUMENTS

| | | | |
|---|---|---|---|
| 1444248 | 5/1966 | France | 411/177 |
| 2167151 | 5/1986 | United Kingdom | 411/34 |

Primary Examiner—Rodney M. Lindsey
Assistant Examiner—Jerry Redman
Attorney, Agent, or Firm—G. H. Telfer

[57] ABSTRACT

A screw-nut arrangement for securing two or more members together is provided with a unique design for a locking nut insert. The locking nut insert has a straight knurled cylindrical portion with an end surface which abuts a shoulder in a counterbore of a through hole and a gripper retainer ring mounted adjacent to the knurled portion. The retainer ring is fabricated from strip material with grippers punched outwardly and is formed into an annular sleeve which fits around the locking nut insert. The retainer ring is held onto the locking nut by a collar.

27 Claims, 3 Drawing Sheets

LOCKING NUT INSERT IN A SCREW-NUT ARRANGEMENT

BACKGROUND OF THE INVENTION

1. Field of the Invention

The invention relates to a screw-nut means for securely fastening a plurality of members of an assembly together, and more specifically, to a locking nut insert placed in a counterbore of one of the members which remains fixedly in place upon rotation and/or axial movement of the screw extending through the bores of the members.

2. Description of the Prior Art

A locking nut insert in a screw-nut arrangement is well known. Generally, two or more members are attached together to form an assembly. The assembly has cooperative holes for forming a through hole for receiving the screw and nut. Typically, a locking nut insert is inserted into several counterbores of the through hole in the base. Its design is such that it is to remain fixedly in place when a screw is inserted into the cooperative bore in one member for attaching the one member to another.

A typical locking nut insert comprises a cylindrical nut with three rows of helical knurled sections around the outer surface, a collar on one end, a flange on the other end, and a toothed washer attached to the flange. The flange, the collar, and one of the rows of knurled sections abut cooperative shoulders of three counterbores of the through hole in the one member of the assembly.

Over a period of time, during continuous use of the assembly which may involve the one member being frequently removed and/or moved away from the other member, the typical locking nut insert tends to become dislodged. One of the main reasons for this dislodgement is that the various forces placed on the screw or members cause the thin flange and the thin washer to bend and/or break allowing movement of the nut insert, and in some instances, loss of the insert through the through hole and/or counterbores of the members of the assembly.

Another reason for this dislodgement is that the dimension or surface area of the shoulder is negligible and the diameters of the collar and knurled sections are almost equal and when the thin flange and/or washer break or are damaged, the typical locking nut insert can be moved in both axial directions in the through hole.

A particular application of the locking nut insert is in a circuit breaker where it is placed in the base and the cover is attached to the base by a screw. The cover and the base have a series of through holes, each receiving a locking nut insert and a screw for attachment of the cover to the base. In the circuit breaker, gases are generated by an arc created during the interruption of current. In some instances, these generated gases push against the cover, causing the screw to pull away from the locking nut insert. If the forces are great enough, the flange and toothed washer of the typical locking nut insert bend or break resulting in the cover being pulled away from the base and loosened. In extreme cases, the cover may be blown off the base. Even if the cover is only slightly loosened, a dislodgement of the locking nut insert a distance of only a 30/1000ths of an inch or approximately 0.762 millimeters could allow an electrical arc and the gases to escape from the breaker causing a short, and thus, a faulty circuit breaker.

Oftentimes, the applied forces in the screwing and unscrewing operation of the screw from the locking insert nut for removal of the cover from the base, cause breakage and/or bending of the flange and/or washer element of the typical locking insert nut.

Since the toothed washer element is flimsy and attached generally to the flange by an adhesive, such as glue, any movement of the screw within the locking nut insert can cause the washer to break away from the flange. This condition may result in binding or cocking of the washer in the bore or on the screw. When the washer is damaged or separated from the flange, the locking insert nut can fall through the back side of the base, and as stated hereinbefore, when the flange is broken, the locking nut insert may be permitted to move or be moved forward in the counterbore. The helical knurled sections of the typical locking nut insert have proven to be insufficient to prevent the nut insert from rotating due to the design of the knurled sections and adjacent collar.

SUMMARY OF THE INVENTION

The present invention has solved the above described problems by providing a unique design for a locking nut insert which assures its fixed placement in an assembly upon insertion and removal of a screw into and from a locking nut insert.

The present invention provides a locking nut insert which has a knurled section and a gripper projection portion. The knurled portion engages the sidewall of a counterbore in one member of the assembly to prevent the insert from rotating. The knurled portion abuts a shoulder in the counterbore preventing axial movement of the nut insert in a first axial direction. Grippers on the gripper projection portion extend radially outwardly toward a second axial direction opposite to the first axial direction. Movement of the insert in this second axial direction causes the grippers to further expand which increases the gripping force to limit or eliminate movement of the locking nut insert in this second axial direction.

It is, therefore, a broad object of the invention to provide in an assembly of two or more members attached together by a locking nut insert with fastening means, a simple and sturdy design for a locking nut insert which is easily inserted into a counterbore of a through hole of one of the members and which remains undamaged in the counterbore in a fixed stationary position regardless of the forces placed upon it particularly by movement of the fastening means.

It is a further object of the invention to provide a locking nut insert in an assembly which does not become dislodged or fall out when the screw is removed from the nut insert.

It is a further object of the invention to provide one or more screw-locking nut insert arrangements in a circuit breaker assembly, whereby the locking nut insert in a base of the assembly remains undamaged and remains in a fixed, stationary position upon insertion and/or removal of the screw from the nut insert.

A further object of the invention is to provide a locking nut insert which in the preceding object tightly secures a cover to the base in a manner that said securement is assured regardless of the pressure buildup in the circuit breaker.

These and other objects of the invention will be more fully understood from the following description of the invention on reference to the illustrations appended hereto.

DESCRIPTION OF THE PREFERRED EMBODIMENT

Figure 1:
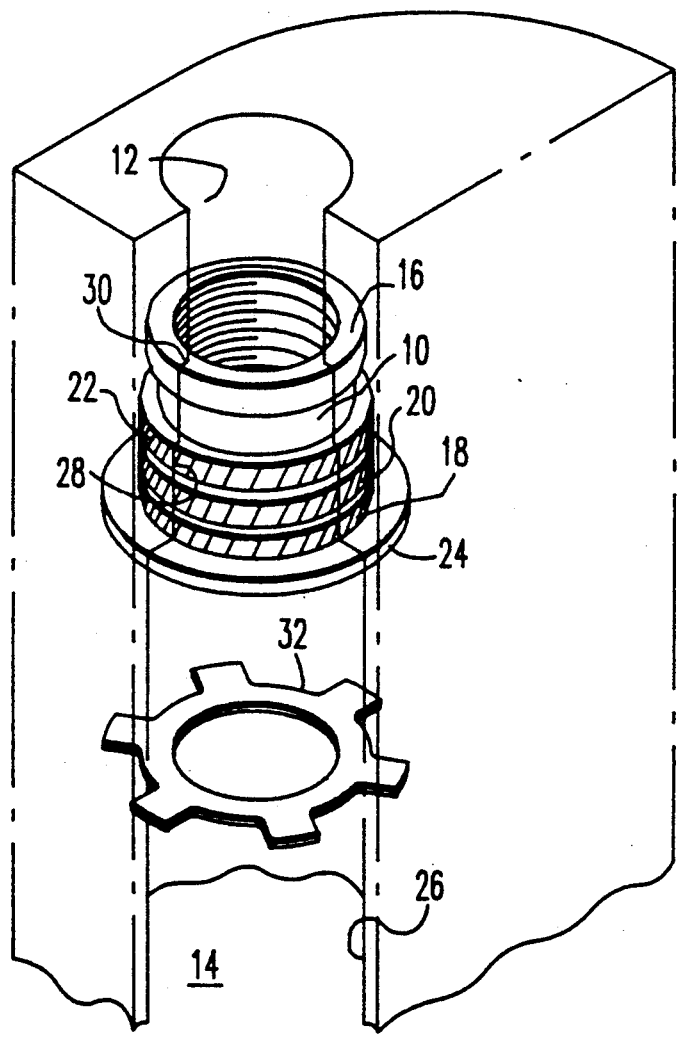
FIG. 1 is an exploded elevational view illustrating a locking nut insert of the prior art.

FIG. 1 illustrates the components and construction of a typical locking nut insert 10 described hereinbefore and indicated in FIG. 1 as prior art. Locking nut insertion 10 is positioned in a through bore 12 of a base 14, and has collar 16, several rows of helical knurled sections 18, 20, 22, and flange 24.

Generally, base 14 is made of a rigid plastic material formed by a well-known molding process. Bore 12 is formed with counterbores 26, 28, 30. Counterbores 26, 28, 30, having different diameters, form shoulders which prevent insert 10 from moving axially upward in FIG. 1. Toothed washer element 32 is fixedly attached to flange 24 to particularly prevent insert 10 from moving downward in FIG. 1.

As explained, flange 24 and washer element 32 of the prior art are relatively thin and easily broken and/or bent. If broken or bent, the flange 24 will not retain the locking nut insert 10 in a fixed axial position, but will permit it to move in both directions within the bore. Furthermore, since the diameter of collar 16 and helical knurled sections 18, 20, 22 are substantially the same, these sections can barely contact the walls of the counterbore 28. Therefore, the gripping action of the knurled sections is insufficient to keep insert 10 of the prior art from rotating.

Figure 2:
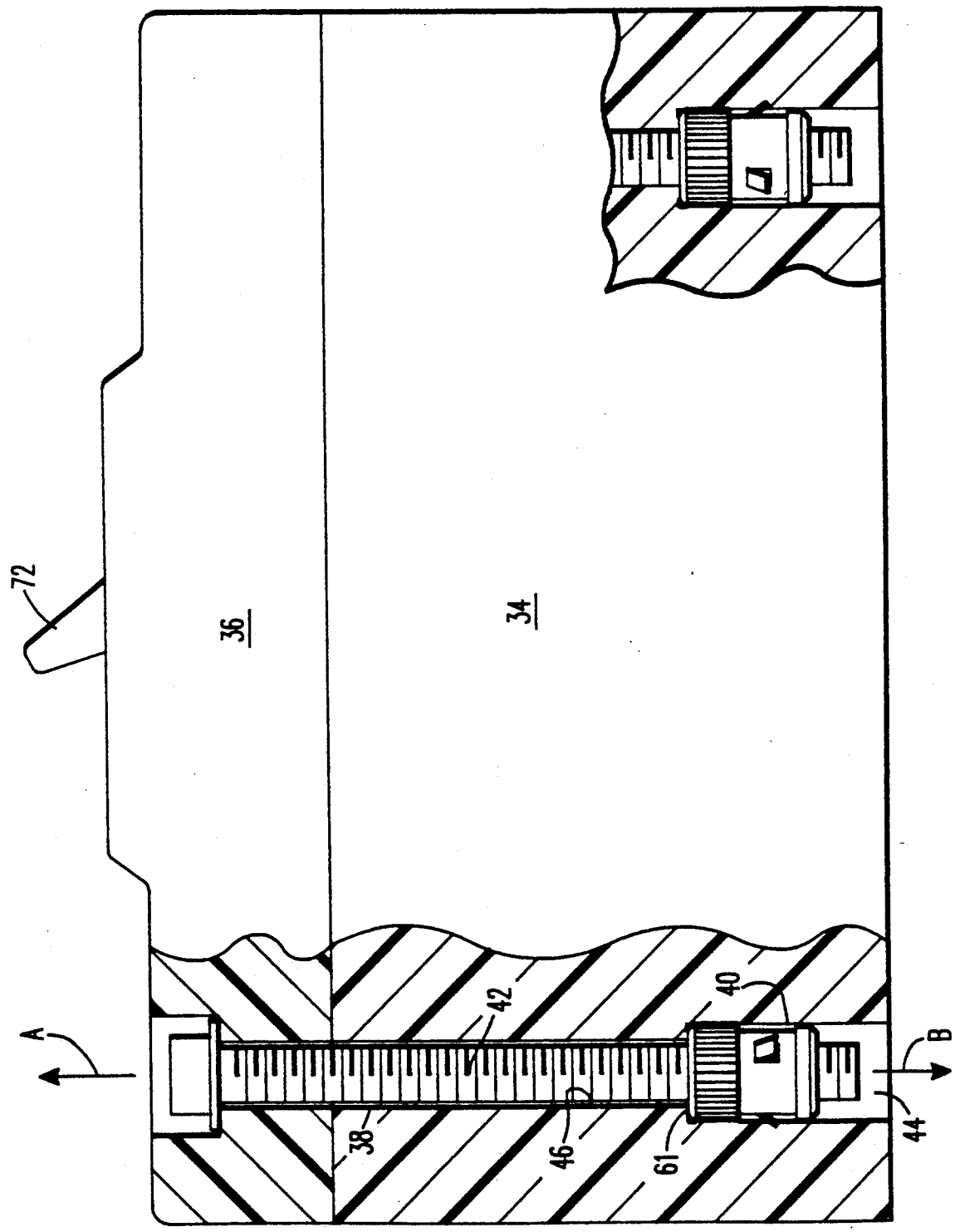
FIG. 2 is an elevational view illustrating a preferred embodiment of the invention in two partially broken away sections.
Figure 3:
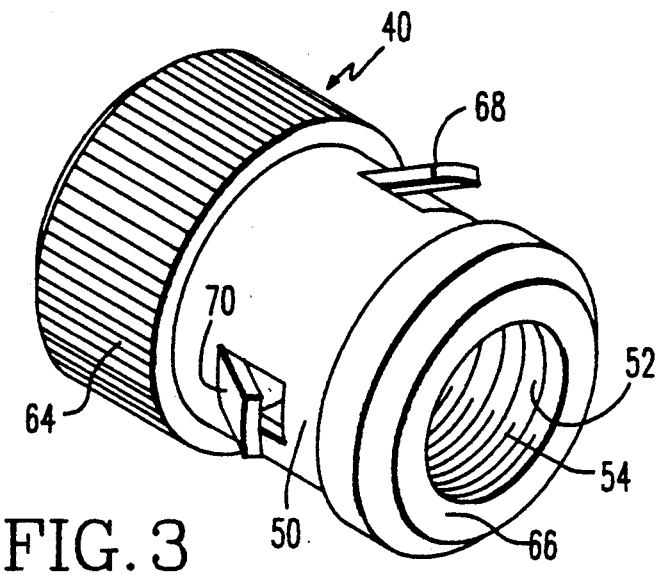
FIG. 3 is an enlarged, view illustrating a locking nut insert of the invention of FIG. 2.
Figure 4:
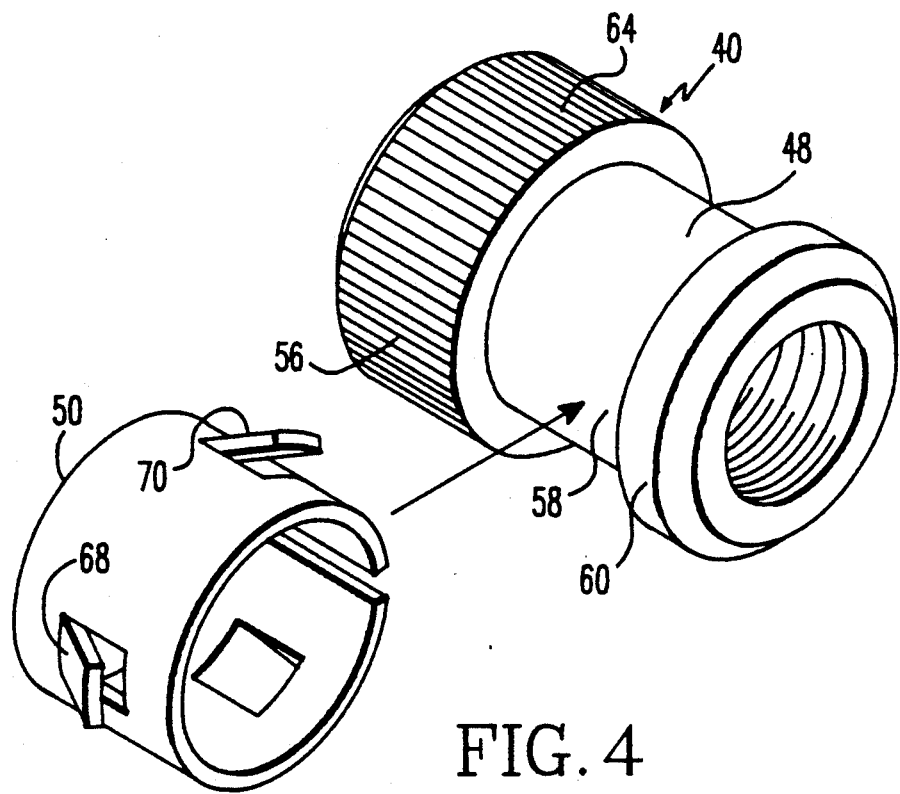
FIG. 4 is an enlarged, exploded view of FIG. 3.

FIGS. 2–4 illustrate the present invention. Even though the invention has wide application for attaching two or more members together to form an assembly, the locking nut insert of the invention will be described in the environment of a circuit breaker.

FIG. 2 shows a base 34 and a cover 36 of an assembly which may generally be a circuit breaker. Base 34 and cover 36 are formed by a well-known plastic molding process, in which cooperative through bores or holes form a through bore 46 extending through the entire assembly. Cover 36 is attached to base 34 by way of several screw-nut arrangements, one of which is shown generally at 38. The screw-nut arrangement 38 shown in FIG. 2 consists of a locking nut insert 40 constructed according to the teachings of the invention and screw 42.

Locking nut insert 40 is positioned by being inserted through the back of base 34 in counterbore 44 of bore 46 which is broken away for clarity and as stated hereinbefore, extends completely through base 34 and cover 36. Screw or bolt 42 is inserted through the front of cover 36 into bore 46, and since locking nut insert 40 is in a fixed position, screw 42 enters into and through insert 40 thereby securely fastening cover 36 to base 34.

As illustrated more clearly in FIGS. 2, 3, and 4, locking nut insert 40 basically comprises a cylindrical member 48 and a gripper ring or sleeve 50.

As particularly illustrated in FIG. 3, cylindrical member 48 has a through hole 52 with internal threads 54 for receiving screw 42 (FIG. 2). Additionally, cylindrical member 48 has cylindrical portions 56, 58, and 60 (FIG. 4). Preferably, the outer diameter of end portions 56 and 60 are greater than the outer diameter of center portion 58. End portion 56 abuts a shoulder 61 (FIG. 2) formed by counterbore 44 and bore 46 to prevent the locking nut insert 40 from moving in an axial direction out of the base 34 as indicated by the arrow pointing in the direction "A" in FIG. 2 (more about which will be discussed herein.)

In referring particularly to FIG. 3, end portion 60 is adjacent to center portion 58 and forms a collar to retain gripper ring 50 on cylindrical member 48 around center portion 58. This end portion 60 secures gripper ring 50 to center portion 58 and prevents gripper ring 50 from being removed from cylindrical member 48 in an axial direction out of base 34 as indicated by the arrow pointing in the direction "B" in FIG. 2.

The outer surface of end portion 56 is machined to form a straight knurled section 64, and the dimension of the diameter of end portion 56 is such that the knurled section 64 engages the walls of counterbore 44 to prevent locking nut insert 40 from rotating within counterbore 44.

As illustrated particularly in FIG. 3, the axial length of end portion 56 is substantially greater than the radial wall thickness of cylindrical member 48. The radial wall thickness of cylinder member 48 can be appreciated by viewing the annular surface or face 66 of cylindrical member 46 which is adjacent to end portion 56. Preferably, the ratio of the axial length to radial thickness is approximately 5 to 1, that is, the axial length of the end portion 56 is five times greater than the radial wall thickness of end portion 56. Preferably, cylindrical member 48 is made of cold rolled steel. From this, it can be appreciated that end portion 56 is sturdy and well-constructed with very little chance for it to be damaged or torn away from the main portion of cylindrical member 48 through normal or even abusive use of the locking nut insert 40.

Referring to FIG. 4, gripper ring 50 is a split ring mounted around center portion 58. Around the outer periphery of gripper ring 50 is a plurality of spaced-apart projections, two of which are shown at 68, 70 in FIGS. 3 and 4. These projections 68, 70 as are the other projections (not shown) are formed by a stamping or punching process, which causes a section of the material of ring 50 to be pushed radially outwardly.

Preferably, gripper ring 50 is formed by taking a flat strip of material, such as stainless steel, cutting it to the required dimension, and stamping or punching out the radial projections. Ring 50 is then bent around center portion 58 of cylindrical member 48 with the projections pointing away from end portion 56 toward collar or end portion 60, as particularly illustrated in FIGS. 2 and 3.

The extent to which these projections on gripper ring 50 project away from the outer surface of ring 50 is such that they initially engage the wall of counterbore 44.

If ring 50 is caused to be moved within bore 44 in the axial direction shown by the arrow pointing in direction B in FIG. 2, more surface area of the projections of gripper ring 50 engage the wall of counterbore 44 causing the projections to be further bent radially outwardly digging more deeply into the wall of counterbore 44 to increase the gripping force of ring 50. In effect, the action of gripper ring 50 prevents substantially little or no axial movement of locking nut insert 40 in the axial direction B in FIG. 2.

Cylindrical member 48 is a one-piece integral construction and is machined to form portions 56, 58, and 60. Preferably, ring 50 is a separate piece. It is to be appreciated, however, that both the cylindrical member 48 and ring 50 can be a one-piece integral construction.

Tests were performed on both the typical locking nut insert and that of the invention.

The first trial run involved pushing the locking nut inserts out of the bottom of the base. The typical insert pushed out at 12 pounds, 8.5 pounds, and 8 pounds. The insert of the invention pushed out at 70 pounds, 88 pounds, and over 100 pounds.

The second trial run involved pulling of the inserts up through the base. The typical insert pulled through at 573 pounds and at 584 pounds. Evidence showed that of the components of the typical locking nut insert that flange 24 broke off first thereby allowing the typical insert to be pulled through the base. The locking nut insert of the invention did not pull through even at 800 pounds. Additional force was not applied because a clamping device used in the trial run showed evidence of bending.

It is to be appreciated that the diameters of the counterbore 44 and bore 46 for forming the shoulder against which annular surface 66 of end portion 56 abuts is such that the length of the shoulder adequately supports and prevents the locking nut insert from moving in an axial direction indicated by the arrow pointing in the direction A in FIG. 2.

FIG. 2 has been described in terms of a circuit breaker where a switch is indicated at 72 for controlling the current. The broken away section to the right of FIG. 2 shows another locking-nut arrangement similar to that of 38 shown to the left. Several additional locking-nut arrangements may be used to retain the cover 36 on base 34.

Whereas particular embodiments of the invention have been described above for purposes of illustration, it will be evident to those skilled in the art that numerous variations of the details may be made without departing from the invention as defined in the appended claims.

What is claimed is:

1. A locking nut insert mounted in a counterbore of a first member which is attached to a second member by fastening means extending into a through bore formed by cooperative bores in said first and second members, wherein said bore and said counterbore of said first member form a shoulder, said locking nut inert comprising:
    a cylindrical member having a recess with means for securing said fastening means to said nut insert,
    a first cylindrical portion abutting said shoulder formed by said bore and said counterbore of said first member to prevent axial movement of said insert in a first axial direction and having a knurled section for engaging the wall of said counterbore to prevent rotation of said nut insert within said counterbore upon rotation of said fastening means,
    a second cylindrical portion having radial gripper projections extending axially outwardly relative to said counterbore for engaging and gripping said wall of said counterbore to prevent axial movement of said nut insert in a second axial direction opposite to that of said first axial direction, and
    said second cylindrical portion having a sleeve member with said gripping projections thereon.

2. A locking nut insert of claim 1, further comprising means for securing said sleeve member to said second cylindrical portion.

3. A locking nut insert of claim 2 wherein said means for securing said sleeve member is a collar adjacent to said second cylindrical portion.

4. A locking nut insert of claim 3, wherein said first and second cylindrical portions are a one-piece construction.

5. A locking nut insert of claim 3, wherein said first and second cylindrical portions and said collar are made of cold rolled steel.

6. A locking nut insert of claim 1, wherein said sleeve member is formed as a strip of material and is bent into shape to fit around said second cylindrical portion.

7. A locking nut insert of claim 6, wherein said strip material for said sleeve member is stainless steel.

8. A locking nut insert of claim 6, wherein said gripping projections on said sleeve member are stamped out of said strip of material prior to said sleeve being secured onto said second cylindrical portion.

9. A locking nut insert of claim 6, further comprising:
    a collar adjacent to said second cylindrical portion for securing said sleeve member around said second cylindrical portion.

10. A locking nut insert of claim 1, wherein said first cylindrical portion has a diameter greater than the diameter of said second cylindrical portion.

11. A locking nut insert of claim 1, wherein said first cylindrical portion has a radial wall thickness,
    wherein said knurled section extends in a linear direction along said axial length of said first cylindrical portion, and wherein said axial length of said first cylindrical portion is substantially greater than said radial wall thickness of said first cylindrical portion.

12. A locking nut insert of claim 11, wherein said axial length of said first cylindrical portion is approximately five times greater than said radial thickness of said first cylindrical portion.

13. A locking type insert of claim 1, wherein said gripping projections on said second cylindrical portion are adapted to be moved radially outwardly upon said axial movement in said second axial direction thereby increasing the gripping force of said gripper projections against said wall of said counterbore.

14. In a circuit breaker assembly having a base member and a cover attached together by a plurality of screw-locking nut insert arrangements, each being mounted in a respective through bore with a counterbore of said base member, said bore and said counterbore forming a shoulder, and said each locking nut insert comprising;
    a cylindrical member with a through hole having internal threads for receiving said screw,
    a first cylindrical portion abutting said shoulder formed by said bore and said counterbore in said through bore in said base member to prevent axial movement of said nut insert by said screw in a first axial direction toward said cover and having a knurled section for engaging the wall of said counterbore to prevent rotation of said nut insert within said counterbore upon rotation of said screw, and a second cylindrical portion having gripper projections extending radially and axially outwardly relative to said counterbore for engaging said wall of said counterbore to prevent axial movement of said nut insert by said screw in a second axial direction away from said cover opposite to that of said first axial direction.

15. A locking nut insert, according to claim 14, wherein
said second cylindrical portion has a sleeve member and said gripper projections are on said sleeve member.

16. A locking nut insert of claim 15, further comprising
means for securing said sleeve member to said second cylindrical portion.

17. A locking nut insert of claim 16 wherein said means for securing said sleeve is a collar adjacent to said second cylindrical portion.

18. A locking nut insert of claim 17, wherein said first and second cylindrical portions are a one-piece integral construction.

19. A locking nut insert of claim 17 wherein said first and second cylindrical portions and said collar are made of cold rolled steel.

20. A locking nut insert of claim 15, wherein said sleeve member is formed as a strip of material and is bent into shape to fit around said second cylindrical portion.

21. A locking nut insert of claim 20, wherein said strip material for said sleeve member is stainless steel.

22. A locking nut insert of claim 20, wherein said gripper projections on said sleeve member are stamped out of said strip of material prior to said sleeve being secured onto said second cylindrical portion.

23. A locking nut insert of claim 20, further comprising;
a collar adjacent to said second cylindrical portion for securing said sleeve member around said second cylindrical portion.

24. A locking nut insert of claim 14, wherein said first cylindrical portion has a diameter greater than the diameter of said second cylindrical portion.

25. A locking nut insert of claim 14, wherein said first cylindrical portion has a radial wall thickness,
wherein said knurled section extends in a linear direction along said axial length of said first cylindrical portion, and
wherein said axial length of said first cylindrical portion is substantially greater than said radial wall thickness of said first cylindrical portion.

26. A locking nut insert of claim 25, wherein said axial length of said first cylindrical portion is approximately five times greater than said radial wall thickness of said first cylindrical portion.

27. A locking nut insert of claim 14, wherein said gripper projections on said second cylindrical portion are adapted to be moved radially outwardly upon said axial movement in said second axial direction thereby increasing the gripping force of said gripper projections against said wall of said counterbore.

* * * * *